United States Patent
King et al.

(10) Patent No.: US 9,546,256 B2
(45) Date of Patent: Jan. 17, 2017

(54) POLYHEDRAL OLIGOMERIC SILSESQUIOXANE GRAFTED POLYMER IN POLYMERIC FOAM

(71) Applicant: Dow Global Technologies LLC, Midland, MI (US)

(72) Inventors: Bruce A. King, Midland, MI (US); Kshitish A. Patankar, Midland, MI (US); Stéphane Costeux, Midland, MI (US); Hyun K. Jeon, Hwaseong-Si (KR)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/437,088

(22) PCT Filed: Nov. 11, 2013

(86) PCT No.: PCT/US2013/069373
§ 371 (c)(1),
(2) Date: Apr. 20, 2015

(87) PCT Pub. No.: WO2014/078215
PCT Pub. Date: May 22, 2014

(65) Prior Publication Data
US 2015/0284527 A1    Oct. 8, 2015

Related U.S. Application Data

(60) Provisional application No. 61/727,864, filed on Nov. 19, 2012.

(51) Int. Cl.
*C08J 9/12*    (2006.01)
*C08J 9/00*    (2006.01)

(52) U.S. Cl.
CPC ............. *C08J 9/122* (2013.01); *C08J 9/008* (2013.01); *C08J 9/0061* (2013.01);
(Continued)

(58) Field of Classification Search
CPC ..................... C08J 2205/05; C08J 2205/042
See application file for complete search history.

(56) References Cited

U.S. PATENT DOCUMENTS 5,804,607 A * 9/1998 Hedrick et al. .......... C08J 9/283
  521/113
6,235,801 B1 * 5/2001 Morales et al. .......... C08J 9/32
  521/154

(Continued)

FOREIGN PATENT DOCUMENTS

WO    2006086789    8/2006
WO    2011066060    6/2011
(Continued)

OTHER PUBLICATIONS

Chen, Y.; Chen, L.; Nie, H.; Kang, E. Low-k nanocomposite films based on polyimides with grafted polyhedral oligomeric silsesquioxane. J app poly sci, 99, 2226-2232 (2006).*
(Continued)

*Primary Examiner* — Mike M Dollinger
*Assistant Examiner* — Christina Wales
(74) *Attorney, Agent, or Firm* — Steven W. Mork

(57) ABSTRACT

A polymeric foam article with a polymer matrix defining multiple cells therein has a polymer component with a first polymer that is a polyhedral oligomeric silsesquioxane grafted polymer that has a weight-average molecular weight of two kilograms per mole or higher and 200 kilograms per mole or lower.

12 Claims, 1 Drawing Sheet

(52) U.S. Cl.
CPC ...... *C08J 2203/06* (2013.01); *C08J 2205/044* (2013.01); *C08J 2205/046* (2013.01); *C08J 2333/12* (2013.01); *C08J 2383/06* (2013.01); *C08J 2425/08* (2013.01); *C08J 2433/12* (2013.01)

(56) References Cited

U.S. PATENT DOCUMENTS

| | | | |
|---|---|---|---|
| 6,933,345 | B1 | 8/2005 | Lichtenhan et al. |
| 2010/0294982 | A1 | 11/2010 | Schiller et al. |
| 2012/0202044 | A1 | 8/2012 | Brant et al. |
| 2012/0321873 | A1* | 12/2012 | Costeux ............... C08J 9/0071 428/220 |

FOREIGN PATENT DOCUMENTS

| | | | |
|---|---|---|---|
| WO | 2011112352 | 9/2011 | |
| WO | WO 2011112352 A1 * | 9/2011 | ............ C08J 9/0071 |

OTHER PUBLICATIONS

Lee Y O et al: "Low-dielectric, 1-15 nanoporous polyimide films prepared from PEO-POSS nanoparticles" Polymer, Elsevier Science Publishers B.V, A GB, vol. 46, No. 23, Nov. 14, 2005 (Nov. 14, 2005), pp. 10056-10065.

Maria Eugenia Romero-Guzma A N et al: "Viscoelastic properties of POSSa styrene nanocomposite blended with polystyrene", Rheologica Acta, Springer-Verlag, DE, vol. 48, No. 6, May 13, 2009 (May 13, 2009), pp. 641-652.

Monticelli, Orietta, et al., "Preparation, Characterization, and Properties of Novel PSMA-POSS Systems by Reactive Blending", Marcromolecules 2009, 42, 6614-6623.

Yiwang Chen, Lie Chen, Huarong Nie, E.T. 1-9 Kang: "Low-k Nanocomposite Films Based on Polyimides with Grafted Polyhedral Oligomeric Silsesquioxane", Journal of Applied Polymer Science, vol. 99, Dec. 8, 2005 (Dec. 8, 2005), pp. 2226-2232.

\* cited by examiner

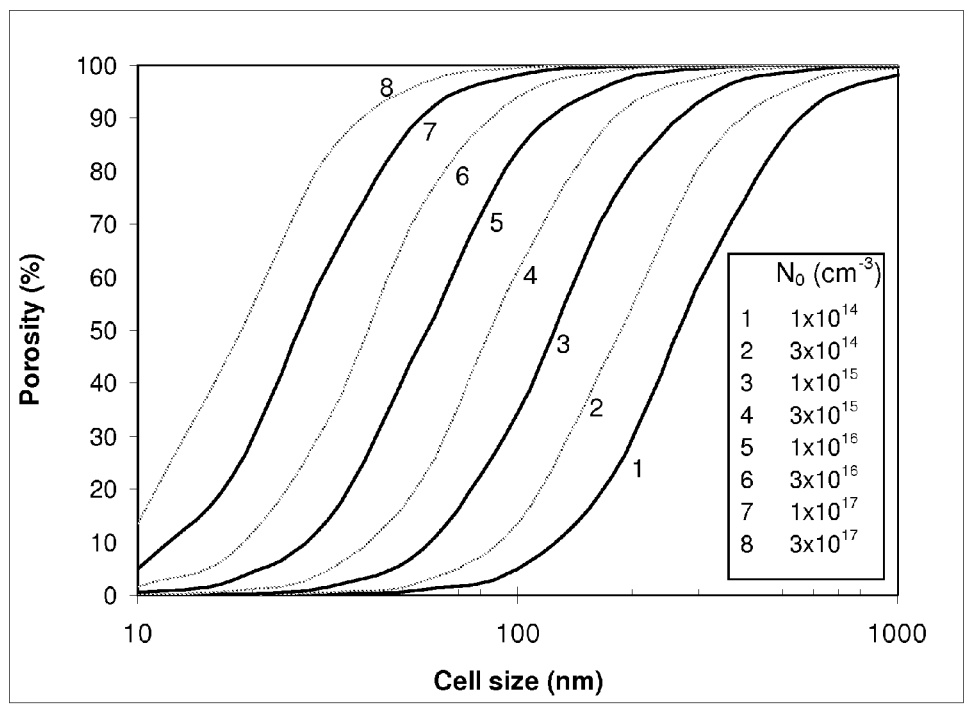

POLYHEDRAL OLIGOMERIC SILSESQUIOXANE GRAFTED POLYMER IN POLYMERIC FOAM

This invention was made with U.S. Government support under contract DE-EE0003916 awarded by the Department of Energy. The U.S. Government has certain rights in this invention

BACKGROUND OF THE INVENTION

Field of the Invention

The present invention relates to polymeric foam containing a polyhedral oligomeric silsesquioxane grafted polymer and a process for preparing such foam.

Introduction

Polymeric foam is a commonly used thermally insulating material. Historically, typical thermally insulating polymeric foam has an average cell size of 100-200 micrometers. However, reducing the average cell size of polymeric foam to the nanometer scale results in a material having greater thermal insulating properties. For example, reducing the average cell size from one micrometer to 300 nanometers (nm) reduces nearly in half the cell gas contribution to thermal conductivity through a foam while reducing the average cell size from one micrometer to less than 100 nm reduces that value to ⅓ of the one micrometer value. Therefore, polymeric foam having nanometer-sized cells (that is, having an average cell size that is less than one micrometer) is desirable as thermally insulating material.

Preparing polymeric foam having nanometer-sized cells at a high enough porosity to effectively serve as thermally insulating material is challenging. Highly porous foam is desirable to reduce thermal conductivity component through the polymer matrix of foam. Foam that is highly porous has more void volume and less polymer volume in the foam structure. Desirably, polymeric foam has a porosity of 70% or higher to minimize the thermal conductivity through the polymer. One method for preparing polymeric foam having nanometer-sized cells (that is, nanofoam) that has a high enough porosity to serve as a thermally insulating material uses a nanometer-sized nucleating additive during the foaming process. For example, WO2011/066060 discloses preparation of nanofoam by incorporating nano-sized nucleating additives such as polyhedral oligomeric silsesquioxane (POSS). It is difficult to disperse nano-sized nucleating additives into a polymer composition efficiently so that they can effectively serve as nucleating agents. WO2011/066060 discloses a process of providing and introducing into a polymer the nano-sized nucleating additives in a sol, wet gel, slurry or solution. Such a method requires a carrier medium distinct from the nano-sized nucleating additive.

U.S. Pat. No. 6,933,345 discloses grafting POSS to polymers to produce compatibilization aids for use in compounding, blending and alloying of polymers with non-reactive POSS reinforcements and other nanoscopic particulates as well as to control polymer morphology. POSS-grafted polymers offer a means for compatibilizing POSS with other materials. However, U.S. Pat. No. 6,933,345 offers only a means for creating polymer blends with the POSS-grafted polymers. Polymers grafted with POSS are larger than nano-sized particles and, while U.S. Pat. No. 6,933,345 teaches that they are useful compatibilization aids, it remains unclear if they are of any value as nucleating agents for creating nano-sized cells in polymeric foam.

It is desirable to find a way to introduce nano-sized nucleating additives into a polymer without using a distinct carrier medium, yet in a manner that allows the nano-sized nucleating additives to nucleate sufficiently to form polymeric foam having nano-sized cells, particularly such polymeric foam having a porosity high enough to serve as a thermally insulating material.

BRIEF SUMMARY OF THE INVENTION

The present invention meets the need of introducing nano-sized nucleating additives into a polymer without using a distinct carrier medium, yet in a manner that allows the nano-sized nucleating additives nucleate sufficiently to form polymeric foam having nano-sized cells, particularly such polymeric foam having a porosity high enough to serve as a thermally insulating material. Surprisingly, grafting the inorganic nucleating agent polyhedral oligomeric silsesquioxane (POSS) onto a polymer that is miscible with the polymer of foamable polymer composition facilitates not only dispersion of the POSS within the foamable polymer composition but results in POSS particles that serve as nano-sized nucleators within the foamable polymer composition that induces expansion of the foamable polymer composition into nanofoam.

In a first aspect, the present invention is a polymeric foam article comprising a polymer matrix that defines multiple cells therein, wherein the polymer matrix comprises polymer component comprising a first polymer that is a polyhedral oligomeric silsesquioxane grafted polymer that has a weight-average molecular weight of two kilogram per mole or higher and 200 kilograms per mole or lower. Desirably, the polymeric foam article has an average cell size that is 0.5 micrometers or smaller.

In a second aspect, the present invention is a process for preparing the polymeric foam article of the first aspect, the process comprising blending a polymer component with a blowing agent at an initial pressure to form a foamable polymer composition and then expanding the foamable polymer composition into a polymeric foam article of the first aspect at a pressure below the initial pressure, the polymer component comprising a first polymer that is a polyhedral oligomeric silsesquioxane grafted polymer that has a weight-average molecular weight of two kilogram per mole or higher and 200 kilograms per mole or lower.

The process of the present invention is useful for preparing the foam of the present invention. The foam of the present invention is useful as a thermal insulating material, filtration medium and/or a low k dielectric material.

BRIEF DESCRIPTION OF THE DRAWINGS

FIG. 1 is a plot of porosity versus average cell size and includes lines designating nucleation site density values to illustrate the relationship between porosity, cell size and nucleation site density.

DETAILED DESCRIPTION OF THE INVENTION

Test methods refer to the most recent test method as of the priority date of this document unless a date is indicated with the test method number. References to test methods contain both a reference to the testing society and the test method number. Test method organizations are referenced by one of the following abbreviations: ASTM refers to ASTM International (formerly known as American Society for Testing and Materials); EN refers to European Norm; DIN refers to Deutsches Institut für Normung; and ISO refers to International Organization for Standards.

Foam articles have three mutually perpendicular dimensions: length, width and thickness. The length dimension lies along the longest dimension of a foam article and typically is along the extrusion direction of an extruded foam article. The thickness dimension is the dimension that has the smallest magnitude but can be equal to the length in, for example, a cube. Width is mutually perpendicular to length and thickness and can have a magnitude equal to or less than the length and equal to or greater than the thickness.

"Polymer" includes polymers consisting of all of the same monomers copolymerized together (homopolymer) as well as polymers comprising combinations of two or more than two different monomers copolymerized together (copolymer).

"Copolymer" refers to a polymer of two or more different monomers or monomer—containing polymers that have been grafted together, copolymerized together, or contain a portion that have been grafted and a portion that have been copolymerized. Unless otherwise indicated, "copolymer" includes block copolymer, graft copolymer, alternating copolymer and random copolymer.

"(meth)acrylic" refers to both "methacrylic" and "acrylic". Hence, a "(meth)acrylic" polymer is a polymer selected from methacrylic polymers and acrylic polymers. "Acrylic" polymers contain polymerized (meth)acrylic monomers. "Methacrylic" polymers contain polymerized methacrylic monomers. A "(meth)acrylic" polymer can be a copolymer containing both methacrylic monomers and acrylic monomers and as such can be both a methacrylic polymer and an acrylic polymer.

"And/or" means "and, or as an alternative". All ranges include endpoints unless otherwise indicated.

The polymeric foam article of the present invention comprises a polymer matrix that defines multiple cells therein. The polymer matrix comprises a polymer component consisting of all the polymers in the polymer matrix and, optionally, all of the polymers in the polymer foam article. The polymer component comprises a first polymer that is a polyhedral oligomeric silsesquioxane (POSS) grafted polymer. The polymer component can consist of the first polymer or further comprise one or more than one additional polymer.

The first polymer is a copolymer having polyhedral oligomeric silsesquioxane (POSS) grafted to a polymer backbone (that is, a POSS grafted polymer). The polymer backbone of the first polymer is desirably selected from (meth)acrylic polymers such as methyl methacrylate and styrenic copolymers such as styrene-maleic anhydride copolymers and styrene-acrylonitrile copolymers. One particularly desirable polymer backbone for the first polymer is poly(methyl methacrylate) (PMMA) and another is styrene-maleic anhydride polymer.

The amount of POSS grafted to the polymer backbone of the first polymer is generally 0.01 weight-percent (wt %) or more, preferably 0.1 wt % or more, more preferably one wt % or more, still more preferably 5 wt % or more, yet more preferably 10 wt % or more, and can be 15 wt % or more, 20 wt % or more, 25 wt % or more, 30 wt % or more, 35 wt % or more, or 40 wt % or more. At the same time, the amount of POSS grafted to the polymer backbone of the first polymer is typically 50 wt % or less. Wt % of POSS grafted to the polymer backbone of the first polymer is based on total weight of grafted first polymer.

The weight-average molecular weight (Mw) of the first polymer is desirably two kilograms per mole (kg/mol) or higher, preferably five kg/mole or higher, more preferably 10 kg/mol or higher and can be 15 kg/mol or higher, 20 kg/mol or higher, 30 kg/mol or higher, even 40 kg/mol or higher. At the same time, the Mw of the first polymer is desirably 200 kg/mol or lower, preferably 195 kg/mol or lower, more preferably 190 kg/mole or lower, still more preferably 150 kg/mol or lower, even more preferably 100 kg/mol or lower and yet more preferably 50 kg/mol or lower. When the Mw of the first polymer is lower than two kg/mol then the molecule is difficult to disperse effectively in a second polymer when a second polymer is used, particularly without using a solvent to help disperse the POSS component. Use of a solvent is undesirable because then the solvent needs to be removed or it may plasticize or remain as an extractable from the resulting foam polymer matrix. The process for preparing foams of the present invention desirably includes dispersing a first polymer in a second polymer without use of a solvent. When the first polymer is more than 200 kg/mol the efficacy of the POSS component as a nucleator surprisingly tends to reduce dramatically.

When the first polymer is used as a minor component in combination with a second polymer (as described below), the Mw of the first polymer is desirably two kg/mol or higher and at the same time 80 kg/mol or lower. The first polymer is a minor component when it accounts for less than 50 wt % of the combination of first and second polymer weight. If the Mw of the first polymer is higher than 80 kg/mol the viscosity of the first polymer can become sufficiently high so that it becomes difficult to disperse efficiently at a molecular scale with a second polymer, depending on the selection of the second polymer.

When the first polymer is used without a second polymer, the Mw of the first polymer is desirably 50 kg/mol or higher, preferably 70 kg/mol or higher, yet more preferably 80 kg/mol or higher, and even more preferably 90 kg/mol or higher and at the same time is desirably 400 kg/mole or lower, preferably 200 kg/mol or lower. If the Mw of the first polymer is lower than 50 kg/mol the viscosity can become too low to easily form a stable foam matrix.

The amount of first polymer in the polymer component is desirably sufficient to provide a concentration of grafted POSS that is 0.05 wt % or more, preferably 0.1 wt % or more, and that can be 0.5 wt % or more, even 0.75 wt % or more based on total polymer component weight. At the same time, the concentration of the first polymer is desirably such that the concentration of grafted POSS is twelve wt % or less, preferably ten wt % or less, more preferably seven wt % or less, yet more preferably five wt % or less, yet even more preferably three wt % or less, still more preferably 2.5 wt % or less and even more preferably one wt % or less based on total weight of the polymer component.

The polymer component can comprise a second polymer that is free from grafted POSS and that is blended with the first polymer. The first and second polymers are desirably miscible. A first and second polymer are miscible if they can be blended together to form a mixture that is transparent and that has a single discernable glass transition temperature (Tg). Determine whether a mixture is "transparent" by compression molding a one (1) millimeter thick film of the mixture and then assessing the transparency according to ASTM method D1003. A transmittance value according to ASTM method D1003 that is greater than 75% indicates the mixture is transparent. Determine whether the mixture has a single Tg by evaluating the mixture according to the differential scanning calorimetry (DSC) method of ASTM E1356-08 during the second heat ramp of the method starting from 20 degrees Celsius (° C.) and ramping the temperature at a rate of 10° C. per minute. If only one Tg is apparent in the evaluation then the mixture has a single Tg.

Examples of suitable second polymers include styrenic polymers and (meth)acrylic polymers. Styrenic polymers include polystyrene homopolymer and copolymers of styrene with other comonomers such as acrylonitrile. Suitable (meth)acrylic polymers include poly(methyl methacrylate) (PMMA), copolymers of methyl methacrylate with other (meth)acrylic monomers such as poly(methyl methacrylate-co-ethyl methacrylate) (PMMA-co-EMA) copolymers and poly(methyl methacrylate-co-ethyl acrylate) (PMMA-co-EA) copolymers.

Desirably, at least 80 wt %, more preferably 90 wt % or more and most preferably 100 wt % of the polymer component is selected from thermoplastic polymers.

Desirably, 50 wt % or more, preferably 75 wt % or more, still more preferably 90 wt % or more and most preferably 100 wt % of the polymer component is selected from styrenic copolymers and (meth)acrylic polymers.

The first polymer provides a delivery means for the inorganic nucleator POSS during the manufacture of the foam of the present invention. Surprisingly, grafting the POSS onto the polymer backbone of the first polymer does not preclude the POSS component from serving as a nucleator that enables formation of polymeric foam having particularly desirable cell characteristics, even when using carbon dioxide as a blowing agent.

For example, the foam of the present invention can have an average cell size of less than one micrometer and preferably has an average cell size of 500 nanometers (nm) or less, more preferably 250 nm or less and can have an average cell size of 100 nm or less, even 75 nm or less. Determine average cell size as a number-average cell size by: (a) preparing a cross section of the polymer foam by cryofracturing the foam; (b) examining a representative portion of the cross section by scanning electron microscopy (SEM), where the representative portion has dimensions in a range of two microns by two microns to ten microns by ten microns; (c) measuring the cell size (distance across the cell, e.g., diameter) of 50-200 random cells in the portion of the cross section; and (d) determining the average of all measured sizes. Desirably, the cell size has a monomodal cell size distribution. However, in any embodiment where the cells size distribution is other than monomodal the process of measuring average cell size should incorporate selection of cells for measuring diameter without consideration of whether the cell size is large or small in order to obtain a true average cell size. For optimal thermal insulation properties it is desirable for 70% or more, preferably 80% or more and still more preferably 85% or more of all cells in the polymeric foam article have a cell size of less than 200 nanometers.

At the same time that the foam of the present invention has an average cell size in any one of the aforementioned ranges the foam desirably has a porosity of 70 percent (%) or more, preferably 75% or more, still more preferably 80% or more, yet more preferably 90% or more.

The porosity characterizes the extent of void volume in a foam. Polymeric foam comprises a polymer matrix that defines within it multiple cells. The volume of the cells of a foam corresponds to the void volume in the foam. Determine porosity of a foam as a percentage (p %) from the density of the foam ($\rho_f$) and the density of the polymer matrix material (all non-void material) of the foam ($\rho_m$) using the following equation:

$$p\% = [1-(\rho_f)/(\rho_m)] \times 100\%$$

Porosity can also be expressed as a ratio (p) instead of a percentage using the following equation:

$$p = [1-(\rho_f)/(\rho_m)]$$

Determine the density of the polymeric foam article ($\rho_f$) by the Archimedes method of ASTM method D-1622-03. Polymeric foam articles of the present invention desirably have a foam density of less than 0.2 grams per cubic centimeters (g/cm$^3$), and can have a density of 0.18 g/cm$^3$ or less.

While having an average cell size in any one of the aforementioned ranges and a porosity in any of the aforementioned ranges, the foam of the present invention can further have a nucleation site density of $5 \times 10^{14}$ cm$^{-3}$ or higher, preferably of $1 \times 10^{15}$ cm$^{-3}$ or higher, preferably $3 \times 10^{15}$ cm$^{-3}$ or higher, still more preferably $1 \times 10^{16}$ cm$^{-3}$ or higher and can be $1 \times 10^{17}$ cm$^{-3}$ or higher. Typically, the effective nucleation site density is less than about $1 \times 10^{19}$ cm$^{-3}$. Nucleation site density is based on a cubic centimeter of non-foamed polymer component. "Nucleation site density", "nucleation density", "effective nucleation site density" and "effective nucleation density" are all interchangeable and refer to the number of nucleation sites that develop into a unique cell in the final foam within a polymer component. To be clear, cells that independently nucleate but that coalesce into a single cell correspond to a single effective nucleation site. Cells that nucleate, but collapse and disappear prior to formation of the final foam do not count as effective nucleation sites. Nucleation site density is reported as number of sites per cubic centimeter with the units of cm$^{-3}$.

Determine the effective nucleation site density ($N_0$) for a polymeric foam article from the porosity ratio (p) of the polymeric foam article, the average cell size in nanometers ($d_{nm}$), the density of the polymeric foam article ($\rho_f$) and density of non-void material in the foam article ($\rho_m$), both in grams per cubic centimeter (g/cm$^3$). Start by calculating the average cell volume ($V_{cell}$) using:

$$V_{cell} = \frac{\pi d_{nm}^3/6}{10^{21}}$$

Determine the average number of cells per cubic centimeter of foam ($N_c$) using:

$$N_c = \frac{p}{V_{cell}} = \left[10^{21} \frac{1-\rho_f/\rho_m}{\pi d_{nm}^3/6}\right]$$

Determine the effective nucleation density ($N_0$) using:

$$N_0 = \frac{N_c}{1-p} = \left[10^{21} \frac{\rho_m/\rho_f - 1}{\pi d_{nm}^3/6}\right]$$

Porosity, effective nucleation site density and average cell size are all inter-related and any two of the values allows calculating of the third. FIG. 1 illustrates a plot of porosity percentage versus average cell size and includes lines designating effective nucleation site density values. Such a plot allows one to use any two of porosity, average cell size and effective nucleation site density to determine the third.

In one particularly desirable embodiment, the polymeric foam article of the present invention has a porosity of 70% or more and at least one of the following characteristics: (i) an average cell size of 250 nm or less; and (ii) a nucleation density of $5 \times 10^{14}$ cm$^{-3}$ or higher.

The polymeric foam article of the present invention can include one or more than one additive dispersed in the polymer component. Suitable additives include those selected from compatibilizers, fire retardants (such as halogenated compounds, including brominated polymers, as well as phosphorous-containing compounds), stabilizers, plasticizers, pigments, colorants, infrared attenuating agents. Nucleating additives (nucleators) can also be included. However, the foam and process of the present invention is desirably free of additional nucleating additives distinct from the first polymer. Additives are typically present at a concentration of five wt % or less and can be present at a concentration of one wt % or less, 0.1 wt % or less, even 0.01 wt % or less where wt % is relative total polymer component weight.

The polymeric foam of the present invention can comprise a crosslinked polymer matrix. Crosslinking can be achieved in the polymer component by irradiating the polymer matrix with the proper frequency of radiation. When crosslinking is desired, the polymer matrix will desirably contain an initiator that instigates crosslinking and/or serves as a crosslinker between polymer chains upon irradiation. Irradiation to achieve crosslinking, if done, typically occurs after all expansion is complete. Irradiation can occur as expansion proceeds, but that is a more difficult process by causing viscosity increase in the polymer matrix during expansion.

Prepare the polymeric foam article of the present invention with the process of the present invention. In general, the process of the present invention comprises blending the polymer component as previously described with a blowing agent to form a foamable polymer composition and then expanding the foamable polymer composition into a polymeric foam article of the present invention.

Desirably, form the polymer component with only a first polymer or by blending together one or more than one first polymer or by blending one or more than one first polymer with one or more than one second polymer. "First polymer" and "second polymer" are as described previously. When blending the first polymer either with another first polymer or with a second polymer it is desirable to avoid using a solvent that is subsequently removed prior to or during expansion of the polymer component into a polymeric foam article. Rather, it is desirable to directly blend the polymer components together to form the final polymer component. Solvent is an undesirable additive because it should be removed so as to not remain in the final polymeric foam article, thereby requiring additional processing of the polymer component. In order to successfully disperse the POSS component so as to achieve optimal nucleation and foam properties (cell size below one micrometer, preferably below 500 nm, more preferably 250 nm or less; a porosity of at least 70% and a nucleation density of at least $5 \times 10^{14}$ cm$^{-3}$) the first polymer desirably has a Mw that is 5 kg/mol or higher and 195 kg/mol or less.

Formation of the foamable polymer composition occurs at, and the foamable polymer composition remains under, an initial pressure that is sufficient so as to dissolve the blowing agent into the thermoplastic polymer and to preclude foaming of the foamable polymer composition due to expansion of the blowing agent. Desirably, the initial pressure is 10 megaPascals (MPa) or higher, preferably 20 MPa or higher, even more preferably 30 MPa or higher in order to fully dissolve blowing agent in the thermoplastic copolymer composition. At the same time, the initial pressure is generally less than 70 MPa, preferably 50 MPa or less, still more preferably 40 MPa or less in order to avoid having to handle extreme pressures, which can keep the process from being of practical interest in producing foam at large scales.

The concentration of total blowing agent in a foamable polymer composition is desirably 18 wt % or more, preferably 20 wt % or more, even more preferably 22 wt % or more and most preferably 24 wt % or more in order to achieve desirable porosity. At the same time, the amount of blowing agent is generally 50 wt % or less, typically 40 wt % or less and often 35 wt % or less. Wt % is based on total foamable polymer composition weight.

The blowing agent desirably comprises carbon dioxide. Desirably, carbon dioxide is present in the foamable polymer composition at a concentration of 20 mole-percent (mol %) or more, preferably 50 mol % or more and can be 75 mol % or more and even 100 mol % based on the total moles of blowing agent. Desirably, carbon dioxide is present at a concentration of 20 wt % or more, preferably 22 wt % or more and most preferably 25 wt % or more. At the same time, carbon dioxide is typically present at a concentration of 50 wt % or less, preferably 40 wt % or less and most preferably 35 wt % or less. Wt % is relative to the total weight of the foamable polymer composition.

Blowing agents other than carbon dioxide can be used with or without carbon dioxide, but the blowing agent preferably contains carbon dioxide. Blowing agents other than carbon dioxide can be selected from any blowing agent commonly used for preparing polymeric foam. Suitable blowing agents include one or any combination of more than one of the following: inorganic gases such as argon, nitrogen, and air; organic blowing agents such as water, aliphatic and cyclic hydrocarbons having from one to nine carbons including methane, ethane, propane, n-butane, isobutane, n-pentane, isopentane, neopentane, cyclobutane, and cyclopentane; fully and partially halogenated alkanes and alkenes having from one to five carbons, preferably that are chlorine-free (e.g., difluoromethane (HFC-32), perfluoromethane, ethyl fluoride (HFC-161), 1,1,-difluoroethane (HFC-152a), 1,1,1-trifluoroethane (HFC-143a), 1,1,2,2-tetrafluoroethane (HFC-134), 1,1,1,2 tetrafluoroethane (HFC-134a), pentafluoroethane (HFC-125), perfluoroethane, 2,2-difluoropropane (HFC-272fb), 1,1,1-trifluoropropane (HFC-263fb), 1,1,1,2,3,3,3-heptafluoropropane (HFC-227ea), 1,1,1,3,3-pentafluoropropane (HFC-245fa), and 1,1,1,3,3-pentafluorobutane (HFC-365mfc)); aliphatic alcohols having from one to five carbons such as methanol, ethanol, n-propanol, and isopropanol; carbonyl containing compounds such as acetone, 2-butanone, and acetaldehyde; ether containing compounds such as dimethyl ether, diethyl ether, methyl ethyl ether; carboxylate compounds such as methyl formate, methyl acetate, ethyl acetate; carboxylic acid and chemical blowing agents such as azodicarbonamide, azodiisobutyronitrile, benzenesulfo-hydrazide, 4,4-oxybenzene sulfonyl semi-carbazide, p-toluene sulfonyl semi-carbazide, barium azodicarboxylate, N,N'-dimethyl-N,N'-dinitrosoterephthalamide, trihydrazino triazine and sodium bicarbonate.

Additives, if present, can be introduced to the polymer composition before or after forming the foamable polymer composition. Typically, additives are blended with the polymer composition prior to addition of blowing agent to form the foamable polymer composition.

The process further includes reducing the pressure on the thermoplastic polymer compound and thereby allowing the blowing agent to expand the thermoplastic polymer into thermoplastic polymer foam. Once all of the blowing agent and any desirable additional additives are mixed into a foamable polymer composition the foamable polymer composition is rapidly exposed to an atmosphere at a lower pressure than the initial pressure in order to allow foaming to occur. The rate of depressurization can influence the effective nucleating site density. Desirably, the rate of depressurization is 10 MegaPascals per second (MPa/s) or higher, preferably 20 MPa/s or higher, more preferably 100 MPa/s or more, still more preferably 200 MPa/s or higher, yet more preferably 500 MPa/s or higher and even more preferably one gigaPascal per second (GPa/s) or higher. At the same time, the rate of depressurization is 7.5 GPa/s or lower, preferably 5 GPa/s or lower and still more preferably 3 GPa/s or lower.

During expansion, the foamable polymer composition expands to form a polymeric foam article. Optionally, an additional conditioning step is beneficial wherein the resulting foam is exposed to further heat (for example by exposure to hot air, hot water or hot oil) and/or possibly steam to induce additional expansion before becoming a polymeric foam article of the present invention.

Foaming can occur by any foaming technique suitable for preparing thermoplastic polymeric foams including batch tank foaming and extrusion foaming.

In batch tank foaming provide a thermoplastic polymer matrix that contains the nucleating additive into a pressure vessel (tank), provide blowing agent into the vessel and pressure the inside of the vessel sufficiently high so as to dissolve the blowing agent in the thermoplastic polymer matrix to a desired concentration. Once a desired concentration of blowing agent is dissolved in the thermoplastic polymer matrix the pressure in the vessel is relieved while the thermoplastic polymer matrix is in a softened state at the foaming temperature and the thermoplastic polymer matrix is allowed to expand into a thermoplastic polymeric foam article. Typically, dissolving blowing agent into the thermoplastic polymer matrix under pressure is sufficient to plasticize the thermoplastic polymer matrix into a softened state without requiring heating above the neat polymer matrix softening temperature (softening temperature in an absence of carbon dioxide), although heat may be applied to the tank if necessary to soften the thermoplastic polymer matrix to facilitate foaming.

An extrusion foam process comprises providing a foamable composition in an extruder at an initial pressure and in a softened state and then expelling the foamable composition at a foaming temperature into an environment of lower pressure than the initial pressure to initiate expansion of the foamable composition into a thermoplastic polymer foam. An extrusion process can be continuous or semi-continuous (for example, accumulative extrusion). In a general extrusion process, prepare a foamable polymer composition by mixing a thermoplastic polymer with a blowing agent in an extruder by heating a thermoplastic polymer composition to soften it, mixing a blowing agent composition together with the softened thermoplastic polymer composition at a mixing (initial) temperature and initial pressure that precludes expansion of the blowing agent to any meaningful extent (preferably, that precludes any blowing agent expansion), desirably cool the foamable polymer composition to a foaming temperature rather than use the initial temperature as the foaming temperature, and then expelling the foamable composition through a die into an environment having a temperature and pressure below the foaming temperature and initial pressure. Upon expelling the foamable composition into the lower pressure the blowing agent expands the thermoplastic polymer into a thermoplastic polymer foam. Desirably, cool the foamable composition after mixing and prior to expelling it through the die. In a continuous process, expel the foamable composition at an essentially constant rate into the lower pressure to enable essentially continuous foaming.

Suitable extrusion foam processes may benefit from cooling the foamable polymer composition to a foaming temperature below the initial temperature before expanding and extensive mixing of foamable polymer composition after cooling to the foaming temperature and prior to extrusion.

Accumulative extrusion is a semi-continuous extrusion process that comprises: 1) mixing a thermoplastic material and a blowing agent composition to form a foamable polymer composition; 2) extruding the foamable polymer composition into a holding zone maintained at a temperature and pressure which does not allow the foamable polymer composition to foam; the holding zone having a die defining an orifice opening into a zone of lower pressure at which the foamable polymer composition foams and an openable gate closing the die orifice; 3) periodically opening the gate while substantially concurrently applying mechanical pressure by means of a movable ram on the foamable polymer composition to eject it from the holding zone through the die orifice into the zone of lower pressure, and 4) allowing the ejected foamable polymer composition to expand into foam.

Coalesced strand foam processes are also suitable embodiments of the present extrusion process. In general, during a coalesced strand foam process a foamable polymer composition extrudes through a die containing multiple orifices oriented such that when the foamable polymer composition expands upon extrusion the resulting strands of foaming polymer contact one another and partially coalesce together. The resulting foam article ("strand foam") is a composition of foam strands extending in the extrusion direction of the foam. A skin typically defines each strand in the coalesced strand foam. While coalesced strand foam processes are suitable, the process can be free of forming independent foam strands and then subsequently fusing the strands together to form stand foam.

Extruded foams and batch tank foams are distinct from expanded polymer bead foam by being free from encapsulated collections of beads. While a strand foam has a skin similar to bead foam, the skin of a strand foam does not fully encapsulate groups of cells but rather forms a tube extending only in the extrusion direction of the foam. The polymeric foam articles of the present invention are preferably batch tank polymeric foam (polymeric foam prepared from a batch tank process) or extruded polymeric foams. Desirably the process of the present invention is a batch tank process or an extrusion foam process.

The foaming process can include a secondary expansion (post expansion or post foaming) step. A secondary expansion step occurs after forming a foam from the thermoplastic polymer by heating the resulting foam for a period of time to soften the polymer and expand the gas in the cells. Typically a secondary expansion step occurs within several minutes of the initial foaming. Heating during the secondary expansion can be accomplished, for example, by subjecting the foam to heated air, heated oil, heated water and/or steam for a period of time.

EXAMPLES

POSS Grafted Polymer

1. SMA-g-POSS (Low Mw)

Prepare a styrene-maleic anhydride (SMA) grafted POSS material (SMA-g-POSS) for use as a first polymer in the present invention using:

(1) styrene-maleic anhydride (SMA) containing 25 mole-percent maleic anhydride with a weight-average molecular weight (Mw) of approximately 9000 grams per mole (~9 kg/mol) and a number average molecular weight (Mn) of approximately 2800 g/mol (for example, catalog number 458 from Scientific Polymer Products); and (2) aminopropylisobutyl POSS (Mw, 0.875 kg/mol; catalog number AM0265 from Hybrid Plastics).

In a 250 milliliter (mL) 3-neck round-bottom flask dissolve 10 grams (g) of SMA in 60 mL of dimethyl formamide (DMF). While stirring, add 1.0 g of aminopropylisobutyl POSS to form a mixture. Heat the mixture in an oil bath to 120° C. to cause the aminopropylisobutyl POSS to dissolve and react with the SMA. Raise the temperature of the mixture to 150° C. and allow the reaction to continue for three hours while mixing. Isolate a resulting solid POSS grafted polymer product by precipitating the product in 300 mL of water, filtering through a fine glass frit and drying overnight in a vacuum oven at 100° C. The resulting polymer (SMA-g-POSS low Mw) has 10 wt % POSS based on grafted polymer weight. The final grafted molecule has a Mw of approximately 10 kg/mol (~10 kg/mol).

2. SMA-g-POSS (High Mw)

Prepare another SMA-g-POSS material using an SMA having a Mw of 195,000 grams per mole (195 kg/mol) and a Mn of 94000 and that is 14 wt % maleic anhydride (for example, DYLARK™ 332 styrene copolymer, DYLARK is a trademark of Nova Chemicals, Inc.). Dissolve 10 g of the SMA in tetrahydrofuran (THF) and add aminopropyl isobutyl POSS (same as previous synthesis) dissolved in THF to a 2-neck round bottom flask and heat to 65° C. for three hours. Then, precipitate the product in methanol, filter and dry under vacuum. Rinse the resulting polymer in methanol and dry under vacuum at 60° C. overnight. Prepare three different forms of this polymer: one with 7 wt % POSS, one with 10 wt % POSS and one with 15 wt % POSS. The final grafted SMA will have a Mw even higher than the 195 kg/mol of the starting SMA due to the addition of POSS. The 7 wt % POSS material is expected to have Mw of approximately 208 kg/mol, 10 wt % POSS material is expected to have a Mw of approximately 214 kg/mol and 15 wt % POSS material is expected to have a Mw of approximately 224 kg/mol.

3. MMA-g-POSS

Prepare a polymer of methyl methacrylate (MMA) grafted with POSS (MMA-g-POSS) by dissolving ten grams of MMA, 1-2 grams methacrylisobutyl POSS (MiBPOSS, catalog number AMA0702 from Hybrid Plastics) and 15-20 milligrams of azobisisobutyronitrile (AIBN) in THF in a 2-necked round bottom flask and heat for four hours under nitrogen at 50-60° C. Precipitate the resulting product in water, isolate the precipitate by filtration and wash with methanol and dry under vacuum at 60° C. for 16 hours. Prepare MMA-g-POSS containing 10 wt %, 15 wt % and 20 wt % methacrylisobutyl POSS co-monomer. Characterize the resulting MMA-g-POSS materials by gel permeation chromatography and infrared spectroscopy to determine molecular with and POSS content. Results as a follows:

| MMA-g-POSS | Mw | Mn |
| --- | --- | --- |
| 10 wt % POSS | 105,400 g/mol | 43,300 g/mol |
| 15 wt % POSS | 88,700 g/mol | 42,500 g/mol |
| 20 wt % POSS | 166,500 g/mol | 74,100 g/mol |

4. MMA-co-EA-g-iBPOSS

Prepare a methacrylate iso-butyl POSS (MAiBPOSS, catalog number AM 0706 from Hybrid Plastics) copolymer by conventional free radical polymerization. In a 40 mL vial with an open top closure with polytetrafluoroethylene/silicon rubber septum, combine 0.2 g MAiBPOSS in powder form with 8.6 g methyl methacrylate (MMA), 1.2 g of ethyl acrylate (EA) and 79 milligrams AIBN with 10 mL of toluene. Stir for two minutes with a magnetic stirrer, deoxygenate by purging with nitrogen gas for 15 minutes. Heat the vial and contents to 70° C. for four hours under nitrogen and while stirring to polymerize. After polymerization, cool the vial to approximately 23° C. and dilute the solution to about 10 volume-percent by adding 80 mL of THF. Precipitate the product by adding an excess amount of hexane. Isolate the precipitate by vacuum filtration and dry under vacuum at 60° C. for 24 hours. Characterize the resulting MMA-co-EA-g-iBPOSS material by gel permeation chromatography and $^{13}$C nuclear magnetic resonance spectroscopy. The resulting MMA-co-EA-g-iBPOSS is 2.6 wt % iBPOSS, 9.3 wt % EA, and 88.1 wt % MMA and has a Mw of 91,100 g/mol and a Mn of 48,700 g/mol.

5. MMA-co-EA-g-iBPOSS (High POSS)

Prepare a high POSS version of MMA-co-EA-g-iBPOSS in like manner as in preparing MMA-co-EA-g-iBPOSS except use 0.5 g MAiBPOSS with 8.3 g methyl methacrylate (MMA), 1.2 g ethyl acrylate and 80 milligrams AIBN with 10 mL of toluene. The resulting MMA-co-EA-g-iBPOSS is 6.2 wt % iBPOSS, 9.4 wt % EA, and 84.4 wt % MMA and has a Mw of approximately 87,800 g/mole and a Mn of approximately 46,500 g/mol.

Polymeric Foam Articles

Prepare polymeric foam articles using a batch foaming process. For those polymeric foam articles that include a polymer in addition to the POSS grafted polymer, compound the POSS grafted polymer with the additional polymer in a Haake blender at 180° C. and 60 revolutions per minute for ten minutes to prepare a polymer component. For Comp Ex A and B, which use a neat polymer rather than a blend, run the neat polymer through the Haake blender under similar conditions. For those polymeric foam articles that only use POSS grafted polymer, use the POSS grafted polymer alone as the polymer component. Compression mold the polymer component into plaques having typical dimensions of 50 millimeters (mm) by 50 mm by 1.5 millimeter at 180° C. under 8.6 megaPascals pressure for two minutes. Cut the resulting plaque into pieces approximately 15 mm by 5 mm in size for use in the foaming process.

Carry out the foaming in a high pressure stainless steel cylindrical vessel (100 mm tall and 25 mm internal diameter) such as that available from Supercritical Fluids Technologies, Inc. Position the vessel in a temperature controlled chamber and connect the vessel to a high pressure carbon dioxide source via an Isco syringe pump (model 100D) and a depressurization device comprising an air actuated ball valve (Swagelok model SS-83PS4. Fill the approximately 5-10% of the vessel volume with the pieces of compression molded plaque polymer components. Seal the vessel and pressurize with carbon dioxide to a Soak Pressure while at a Soak Temperature for a specific period of time (Soak Time), as stated with the samples below. After soaking with carbon dioxide for the specific Soak Time, rapidly release the pressure in the vessel by opening the air actuated ball valve to achieve a depressurization rate between 0.7 and 3 gigaPascals (GPa) per second. Inside, the polymer compound expands to form a polymeric foam article. Immediately expose the resulting polymeric foam article to a water bath at a post foaming temperature (PF temp) of 65-70° C. for a post foaming time (PF time) of 1.5-2 minutes. Characterize the final polymeric foam article by determining average cell size, porosity, and nucleation density by the methods described prior herein.

Polymeric Foam Articles Comprising SMA-g-POSS Low Mw in SPP100

Prepare Comparative Example (Comp Ex) A using only SPP100 to serve as a reference. SPP100 is a methyl methacrylate (MMA)-ethyl methacrylate (EMA) copolymer that is 45.2 wt % MMA and 54.8 wt % EMA with a weight average molecular weight of 372 kg/mol, number average molecular weight (Mn) of 121 kg/mol and glass transition temperature (Tg) of 91.4° C.

Prepare Examples (Exs) 1-4 by blending SMA-g-POSS Low Mw into SPP100 at a concentration sufficient to achieve the wt % POSS for the Ex as shown in Table 1. For example, SMA-g-POSS comprises 10 wt % POSS so a polymer component that contains 2.5 wt % SMA-g-POSS will contain 0.25 wt % POSS. The SMA-g-POSS is miscible in SPP100.

TABLE 1

SMA-g-POSS Low Mw in SPP100

| | Comp Ex A | Ex 1 | Ex 2 | Ex 3 | Ex 4 |
|---|---|---|---|---|---|
| Polymer Component | | | | | |
| Polymer Component | 100 wt % SPP100 | 0.5 wt % SMA-g-POSS in SPP100 | 0.5 wt % SMA-g-POSS in SPP100 | 1.25 wt % SMA-g-POSS in SPP100 | 5 wt % SMA-g-POSS in SPP100 |
| First Polymer Mw (kg/mol) | N/A | ~10 | ~10 | ~10 | ~10 |
| Wt % POSS in polymer component | 0 | 0.05 | 0.05 | 0.125 | 0.5 |
| Foaming Parameters | | | | | |
| Soak Pressure (MPa) | 33 | 33 | 33 | 33 | 33 |
| Soak Time (hours) | 2 | 2 | 2 | 2 | 2 |
| Soak Temp (° C.) | 50 | 35 | 50 | 35 | 50 |
| PF Temp (° C.) | 70 | 65 | 65 | 65 | 65 |
| PF Time (minutes) | 1.5 | 2 | 2 | 2 | 1.5 |
| Foam Characteristics | | | | | |
| Porosity (%) | 86.9 | 84.8 | 85 | 83.1 | 81.2 |
| Average Cell Size (nm) | 700 | 150 | 150 | 200 | 170 |
| Nucleation Density (cm$^{-3}$) | $3.69 \times 10^{13}$ | $3.2 \times 10^{15}$ | $3.2 \times 10^{15}$ | $1.2 \times 10^{15}$ | $1.7 \times 10^{15}$ |

The data in Table 1 reveals that use of the SMA-g-POSS Low Mw in combination with the SPP100 results in both a dramatic decrease in the cell size as well as a two order of magnitude increase in nucleation density. That effect is evident over an order of magnitude range in SMA-g-POSS Low Mw concentration.

Polymeric Foam Articles Comprising SMA-g-POSS Low Mw in VM100

Prepare Comp Ex B using only VM100 to serve as a reference. VM100 is a MMA-ethyl acrylate (EA) copolymer that is 91 wt % MMA and 9 wt % EA and having a Mw of 94 g/mol, Mn of 52.8 g/mol and Tg of 96° C. (available from Arkema).

Prepare Exs 5 and 6 by blending SMA-g-POSS Low Mw into VM100 at a concentration sufficient to achieve the wt % POSS for the Ex as shown in Table 2. For example, SMA-g-POSS comprises 10 wt % POSS so a polymer component that contains 2.5 wt % SMA-g-POSS will contain 0.25 wt % POSS. The SMA-g-POSS is miscible with VM100.

TABLE 2

SMA-g-POSS Low Mw in VM100

| | Comp Ex B | Ex 5 | Ex 6 |
|---|---|---|---|
| Polymer Component | | | |
| Polymer Component | 100 wt % VM100 | 0.5 wt % SMA-g-POSS in VM100 | 5 wt % SMA-g-POSS in VM100 |
| First Polymer Mw (kg/mol) | N/A | ~10 | ~10 |
| Wt % POSS in polymer component | 0 | 0.05 | 0.5 |
| Foaming Parameters | | | |
| Soak Pressure (MPa) | 33 | 33 | 33 |
| Soak Time (hours) | 3 | 3 | 3 |
| Soak Temp (° C.) | 35 | 35 | 35 |
| PF Temp (° C.) | 60 | 60 | 60 |
| PF Time (minutes) | 2 | 2 | 2 |
| Foam Characteristics | | | |
| Porosity (%) | 80.7 | 77.2 | 71.3 |
| Average Cell Size (nm) | 405 | 183 | 164 |
| Nucleation Density (cm$^{-3}$) | $1.2 \times 10^{14}$ | $1.1 \times 10^{15}$ | $1.1 \times 10^{15}$ |

The data in Table 2 reveals that use of the SMA-g-POSS Low Mw in combination with the VM100 results in both a dramatic decrease in the cell size as well as an increase in nucleation density. That effect is evident over an order of magnitude range in SMA-g-POSS Low Mw concentration.

Polymeric Foam Articles Comprising SMA-g-POSS High Mw

Prepare Comp Exs C-E by blending SMA-g-POSS High Mw into SPP100 at a concentration sufficient to achieve 0.125 wt % POSS in the Polymer Component. Use an SMA-g-POSS High Mw with different wt % POSS on the grafted polymer as shown in Table 3 in order to determine if that parameter effects results. The SMA-g-POSS High Mw is miscible in SPP100.

TABLE 3

SMA-g-POSS High Mw

|  | Comp Ex C | Comp Ex D | Comp Ex E |
|---|---|---|---|
| Polymer Component | | | |
| Mw of first polymer (kg/mol) | 208 | 214 | 224 |
| Wt % POSS in SMA-g-POSS | 7 | 10 | 15 |
| Wt % POSS in polymer component | 0.125 | 0.125 | 0.125 |
| Foaming Parameters | | | |
| Soak Pressure (MPa) | 33 | 33 | 33 |
| Soak Time (hours) | 2 | 2 | 2 |
| Soak Temp (° C.) | 50 | 50 | 50 |
| PF Temp (° C.) | 65 | 65 | 65 |
| PF Time (minutes) | 2 | 2 | 2 |
| Foam Characteristics | | | |
| Porosity (%) | 84 | 83.4 | 83.3 |
| Average Cell Size (nm) | 650 | 550 | 500 |
| Nucleation Density (cm$^{-3}$) | $3.7 \times 10^{13}$ | $5.8 \times 10^{13}$ | $7.6 \times 10^{13}$ |

The data in Table 3 reveals that use of the SMA-g-POSS High Mw in combination with the SPP100 slightly decreases cell size but leaves porosity and nucleation density essentially the same as Comp Ex A, the polymeric foam article with a polymer component of only SPP100. Hence, the high Mw SMA-g-POSS does not have the effect of dramatically increasing nucleation density while decreasing cell size as is evident with SMA-g-POSS Low Mw.

Polymeric Foam Articles Comprising Aminopropylisobutyl POSS

In order to explore a lower end of POSS Mw for an potential nucleator of POSS with an organic component prepare polymeric foam articles using as the first polymer the aminopropylisobutyl POSS (Mw of 874.58 grams per mole). Prepare Comp Exs B and C using a polymer component that contains SPP100 blended with aminopropylisobutyl POSS to the POSS concentration indicated in Table 4. Foaming parameters and characteristics of the resulting foam are also in Table 4. The Aminopropylisobutyl POSS is not miscible with SPP100.

TABLE 4

Aminopropylisobutyl POSS in SPP100

|  | Comp Ex F | Comp Ex G |
|---|---|---|
| Polymer Component | | |
| Mw of first polymer (kg/mol) | 0.875 | 0.875 |
| Wt % POSS in polymer component | 0.25 | 0.5 |
| Foaming Parameters | | |
| Soak Pressure (MPa) | 33 | 33 |
| Soak Time (hours) | 2 | 2 |
| Soak Temp (° C.) | 50 | 50 |
| PF Temp (° C.) | 65 | 65 |
| PF Time (minutes) | 2 | 2 |
| Foam Characteristics | | |
| Porosity (%) | 85 | 84 |
| Average Cell Size (nm) | 2000-3000 | 2000-3000 |
| Nucleation Density (cm$^{-3}$) | $\sim 8 \times 10^{11}$ | $\sim 8 \times 10^{11}$ |

The fact that the Aminopropylisobutyl POSS is not miscible with SPP100 reveals that a POSS having a low Mw organic component does not disperse readily into the second polymer as a POSS as required for the first polymer in the present invention. As a result, lower quality foaming results are achieved.

The data in Table 4, compared with the data of Comp Ex A in Table 1, reveals that use of the Aminopropylisobutyl POSS in combination with the SPP100 results in an undesirable dramatic increase in average cell size. Hence, POSS having an organic component bound to it, but an organic component having a very low Mw does not serve to nucleate appropriate to decrease the average cell size of the resulting polymeric foam article, at least not when compounded into a polymer component in like manner as the large Mw grafted POSS compounds.

Polymeric Foam Articles Comprising MMA-g-POSS

Prepare Exs 7-9 by blending MMA-g-POSS High Mw into SPP100 at a concentration sufficient to achieve 0.1 wt % POSS in the Polymer Component. Use an MMA-g-POSS with different wt % POSS on the grafted polymer as shown in Table 5 in order to determine if that parameter effects results. The MMA-g-POSS is miscible in SPP100.

The data in Table 5 reveals that the MMA-g-POSS produces a high nucleation density and lower average cell size relative to the SPP100 polymer itself (see Comp Ex A in Table 1).

TABLE 5

MMA-g-POSS

|  | Ex 7 | Ex 8 | Ex 9 |
|---|---|---|---|
| Polymer Component | | | |
| First polymer Mw (kg/mol) | 105.4 | 88.7 | 166.5 |
| Wt % POSS in MMA-g-POSS | 10 | 15 | 20 |
| Wt % POSS in polymer component | 0.1 | 0.1 | 0.1 |
| Foaming Parameters | | | |
| Soak Pressure (MPa) | 33 | 33 | 33 |
| Soak Time (hours) | 2 | 2 | 2 |
| Soak Temp (° C.) | 50 | 50 | 50 |
| PF Temp (° C.) | 65 | 65 | 65 |
| PF Time (minutes) | 2 | 2 | 2 |
| Foam Characteristics | | | |
| Porosity (%) | 84.7 | 85.2 | 85.2 |
| Average Cell Size (nm) | 330 | 430 | 370 |
| Nucleation Density (cm$^{-3}$) | $2.9 \times 10^{14}$ | $1.4 \times 10^{14}$ | $2.2 \times 10^{14}$ |

Polymeric Foam Article Using Only Grafted POSS Polymer

Prepare Ex 10 using only the MMA-co-EA-g-iBPOSS material without blending it with any other polymer. Prepare Ex 11 using the MMA-co-EA-g-iBPOSS (High POSS) material without blending it with any other polymer. The foaming conditions and foam characteristics are shown in Table 6. Notably, there was no post-foam expansion for these examples.

TABLE 6

MMA-co-EA-g-iBPOSS

|  | Ex 10 | Ex 11 |
|---|---|---|
| Polymer Component | | |
| Mw of first polymer (kg/mol) | 91.1 | 87.8 |
| Wt % POSS in MMA-co-EA-g-iBPOSS (polymer component) | 2.6 | 6.2 |

TABLE 6-continued

MMA-co-EA-g-iBPOSS

| | Ex 10 | Ex 11 |
|---|---|---|
| Foaming Parameters | | |
| Soak Pressure (MPa) | 30 | 30 |
| Soak Time (hours) | 6* | 6* |
| Soak Temp (° C.) | 35 | 35 |
| PF Temp (° C.) | N/A | N/A |
| PF Time (minutes) | N/A | N/A |
| Foam Characteristics | | |
| Porosity (%) | 74.1 | 71 |
| Average Cell Size (nm) | 225 | 200 |
| Nucleation Density (cm$^{-3}$) | $3.4 \times 10^{14}$ | $5.9 \times 10^{14}$ |

*Foaming was done using three millimeter thick polymer pieces instead of 1.5 millimeter thick polymer pieces for Ex 10 and Ex 11. As a result, longer Soak Times were used to incorporate blowing agent.

Examples 10 and 11 illustrate a process and polymeric foam article of the present invention with a polymer component consisting of only first polymer (a polyhedral oligomeric silsesquioxane grafted polymer).

What is claimed is:

1. A polymeric foam article comprising a polymer matrix that defines multiple cells therein, wherein the polymer matrix comprises a polymer component consisting of all the polymers in the polymer matrix and comprising a first polymer that is a polyhedral oligomeric silsesquioxane grafted polymer that has a weight-average molecular weight of two kilograms per mole or higher and 80 kilograms per mole or lower and wherein the polymeric foam article has a thickness of more than 1.5 millimeters and wherein the polymer component comprises a second polymer blended with the first polymer, the second polymer being free of polyhedral oligomeric silsesquioxane and being miscible with the first polymer.

2. The polymeric foam article of claim 1, wherein the second polymer is a (meth)acrylic polymer.

3. The polymeric foam article of claim 1, further characterized by having an average cell size that is less than 0.5 micrometers.

4. The polymeric foam article of claim 1, further characterized by having an porosity of 70 percent or more and at least one of the following characteristics: (i) an average cell size of 250 nanometers or less; and (ii) a nucleation density of $5 \times 10^{14}$ cm$^{-3}$ or higher.

5. The polymeric foam of claim 1, further characterized by having a porosity of 80 percent or more.

6. The polymeric foam article of claim 1, further characterized by more than 50 weight-percent of the polymers in the polymer component are second polymers selected from styrenic copolymers and (meth)acrylic polymers.

7. The polymeric foam article of claim 1, wherein the concentration of polyhedral oligomeric silsesquioxane that is grafted to polymer is 0.05 weight-percent or more and seven weight-percent or less based on total weight of polymer component.

8. A process for preparing the polymeric foam article of claim 1, the process comprising blending a polymer component with a blowing agent at an initial pressure to form a foamable polymer composition and then expanding the foamable polymer composition into a polymeric foam article of claim 1 at a pressure below the initial pressure, the polymer component comprising a first polymer that is a polyhedral oligomeric silsesquioxane grafted polymer that has a weight-average molecular weight of two kilograms per mole or higher and 80 kilograms per mole or lower and wherein the polymer component comprises a second polymer blended with the first polymer, the second polymer being free of polyhedral oligomeric silsesquioxane and being miscible with the first polymer.

9. The process of claim 8, wherein the second polymer is a (meth)acrylic polymer.

10. The process of claim 8, wherein the blowing agent comprises carbon dioxide.

11. The process of claim 8, characterized by forming a foamable polymer composition comprising first polymer that is a polyhedral oligomeric silsesquioxane grafted polymer and blowing agent that comprises carbon dioxide and allowing the foamable polymer composition to expand into a polymeric foam characterized by having a porosity of 70 percent or more and at least one of the following characteristics: (i) an average cell size of 250 nanometers or less; and (ii) a nucleation density of $5 \times 10^{14}$ cm$^{-3}$ or higher.

12. The process of claim 8, further comprising the step of preparing the polymer component in an absence of solvent that is subsequently removed prior to or during expansion of the polymer component into the polymeric foam article.

* * * * *